United States Patent
Naito et al.

(10) Patent No.: US 11,526,783 B2
(45) Date of Patent: Dec. 13, 2022

(54) ABNORMALITY DETERMINATION DEVICE, LEARNING DEVICE, AND ABNORMALITY DETERMINATION METHOD

(71) Applicant: KABUSHIKI KAISHA TOSHIBA, Minato-ku (JP)

(72) Inventors: Susumu Naito, Yokohama (JP); Kouta Nakata, Shinagawa (JP); Yasunori Taguchi, Kawasaki (JP); Yuichi Kato, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 525 days.

(21) Appl. No.: 16/788,355

(22) Filed: Feb. 12, 2020

(65) Prior Publication Data

US 2021/0065023 A1 Mar. 4, 2021

(30) Foreign Application Priority Data

Aug. 26, 2019 (JP) .............................. JP2019-153993

(51) Int. Cl.
| | | |
|---|---|---|
| *G06N 5/04* | (2006.01) | |
| *G06N 5/02* | (2006.01) | |
| *G06N 20/00* | (2019.01) | |
| *G05B 13/04* | (2006.01) | |

(52) U.S. Cl.
CPC ................ *G06N 5/04* (2013.01); *G05B 13/04* (2013.01); *G06N 5/02* (2013.01); *G06N 5/042* (2013.01); *G06N 20/00* (2019.01)

(58) Field of Classification Search
CPC ............ G06N 5/04; G06N 5/02; G06N 5/042; G06N 20/00; G06N 3/088; G06N 3/0454; G06N 3/049; G06N 7/005; G06N 20/20; G05B 13/04; G05B 19/4183; G05B 23/0294; F24F 11/64; G06B 23/02; G06F 11/3466; G06V 20/52; G08B 31/00

See application file for complete search history.

(56) References Cited

FOREIGN PATENT DOCUMENTS

| CN | 102449660 A | * | 4/2010 | ............ G06V 20/52 |
|---|---|---|---|---|
| CN | 108520080 A | * | 9/2018 | |
| CN | 109990430 A | * | 7/2019 | ............. F24F 11/64 |
| CN | 106030565 B | * | 8/2019 | ........... G06F 11/3466 |
| JP | 4046309 B2 | | 2/2008 | |
| JP | 2008304970 A | * | 12/2008 | |

(Continued)

*Primary Examiner* — Kandasamy Thangavelu
(74) *Attorney, Agent, or Firm* — Oblon, McClelland, Maier & Neustadt, L.L.P.

(57) ABSTRACT

An abnormality determination device includes one or more processors. The processors input first input data to a first model to obtain first output data. The first output data is formed by restoring data with the reduced dimension to data with the same dimension as that of the first input data. The processors input second input data, which is a difference between the first input data and the first output data, to a second model, and obtain second output data. The second output data is formed by restoring data with the reduced dimension to data with the same dimension as that of the second input data. The processors obtain restored data that is a sum of the first output data and the second output data. The processors compare the first input data with the restored data and determine an abnormality in the first input data based on the comparison result.

12 Claims, 15 Drawing Sheets

(56) References Cited

FOREIGN PATENT DOCUMENTS

| | | | |
|---|---|---|---|
| JP | 5530019 B1 * | 6/2014 | |
| JP | 2018-112852 A | 7/2018 | |
| WO | WO 2017094267 A1 * | 6/2017 | ............. G06N 7/005 |

* cited by examiner

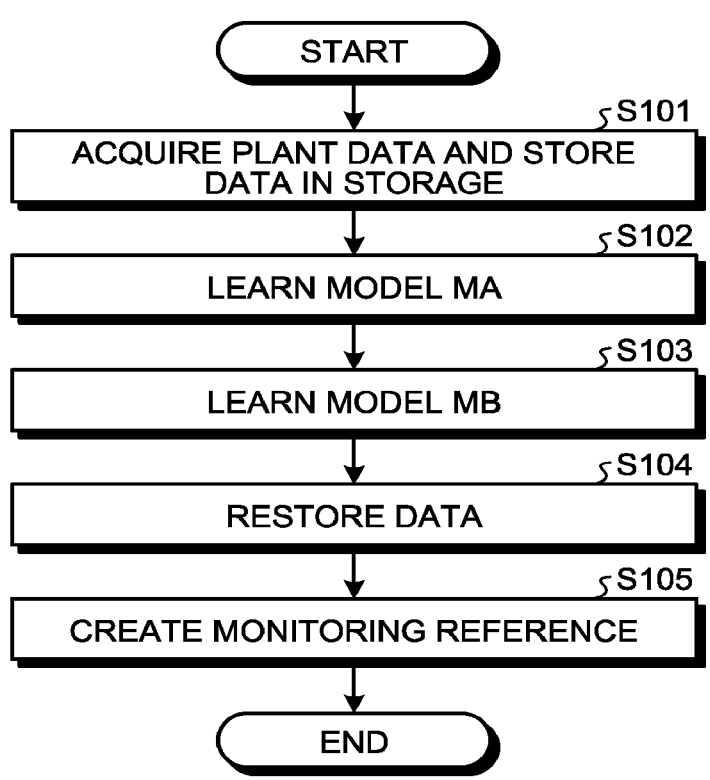
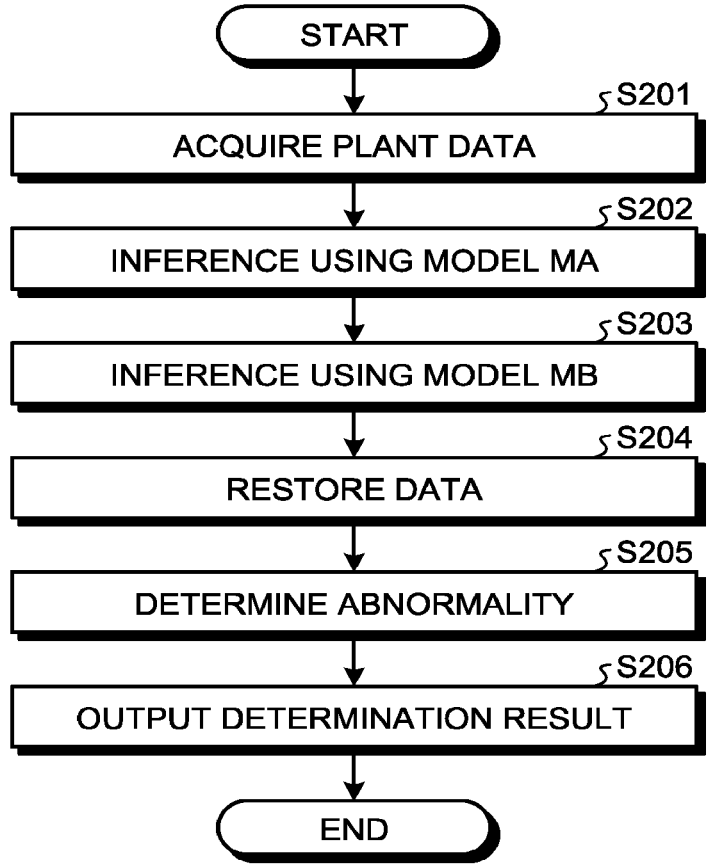

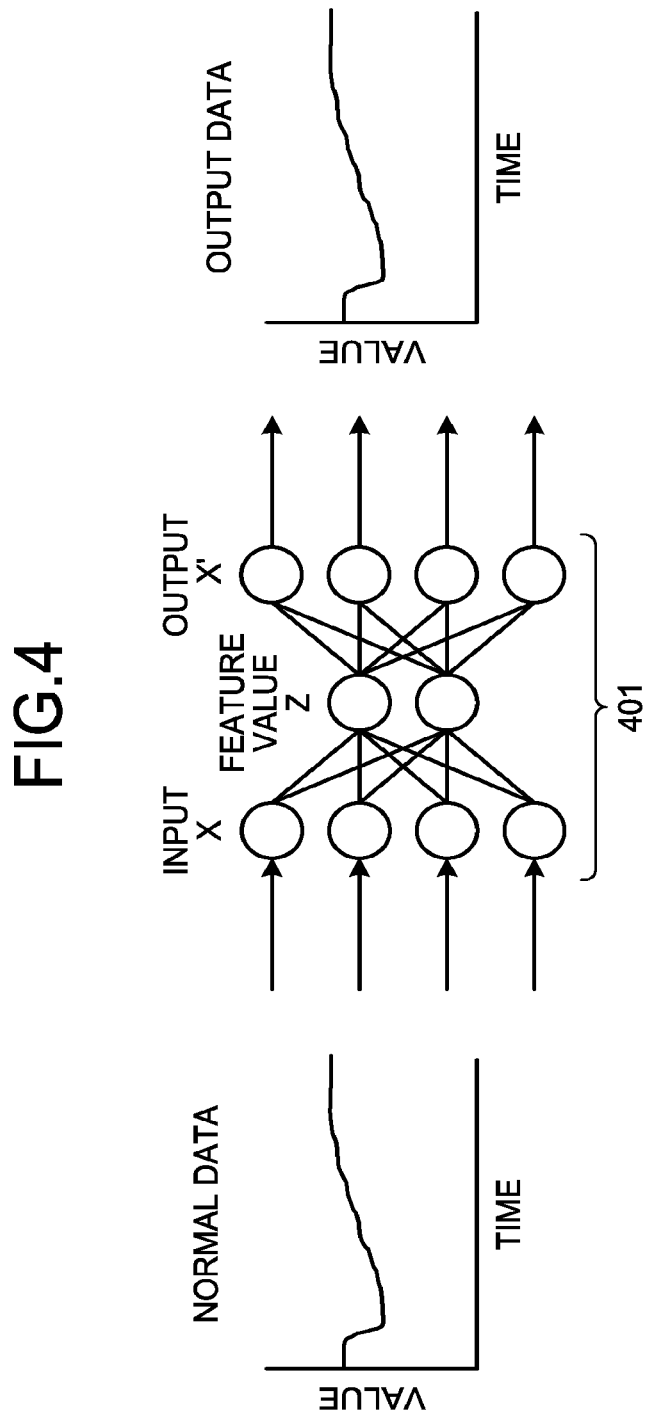

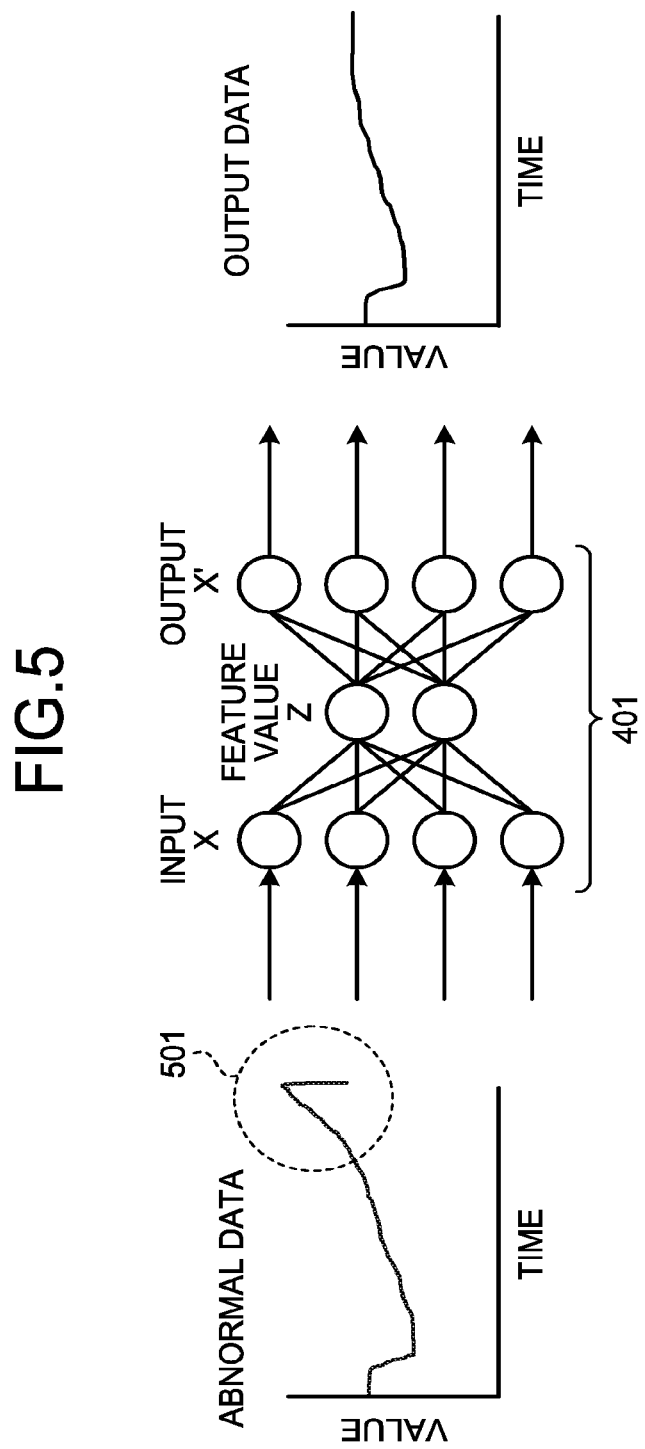

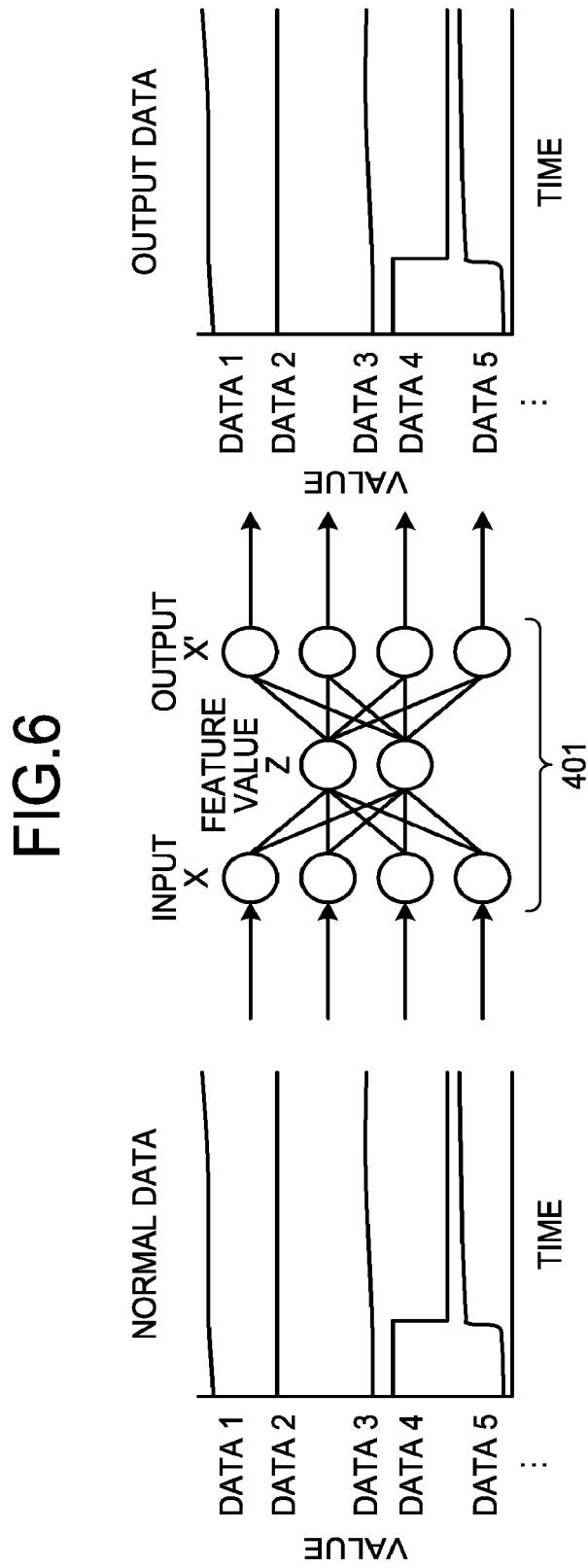

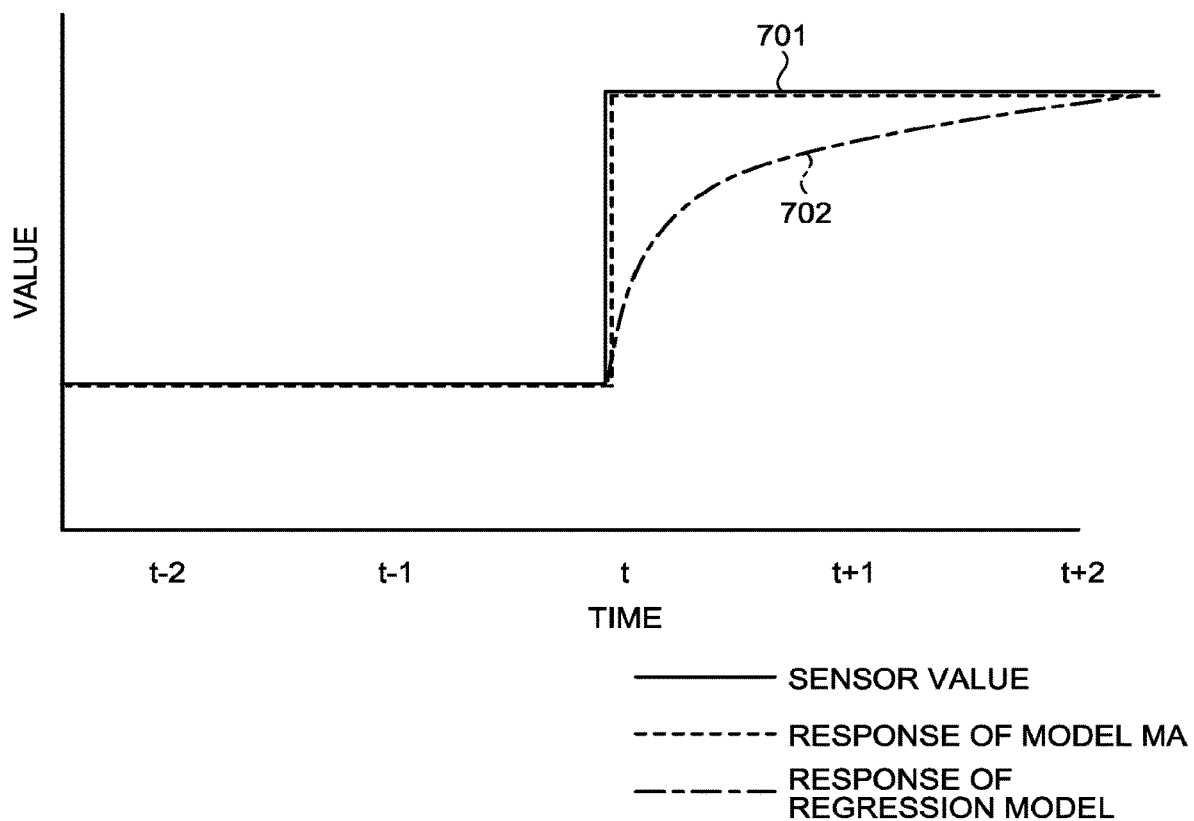

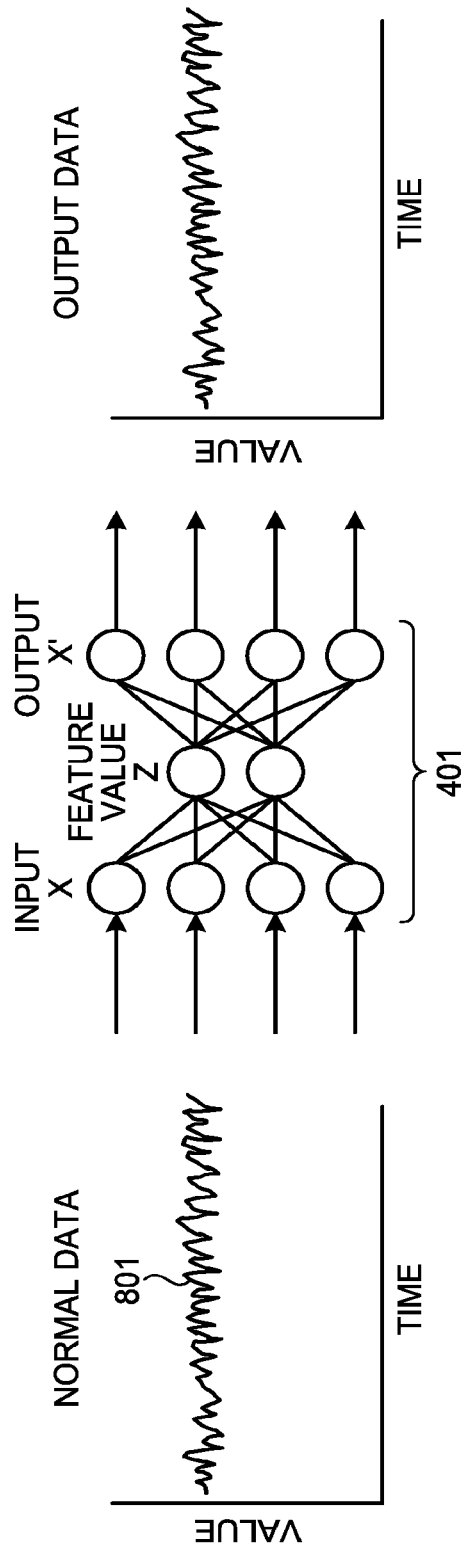

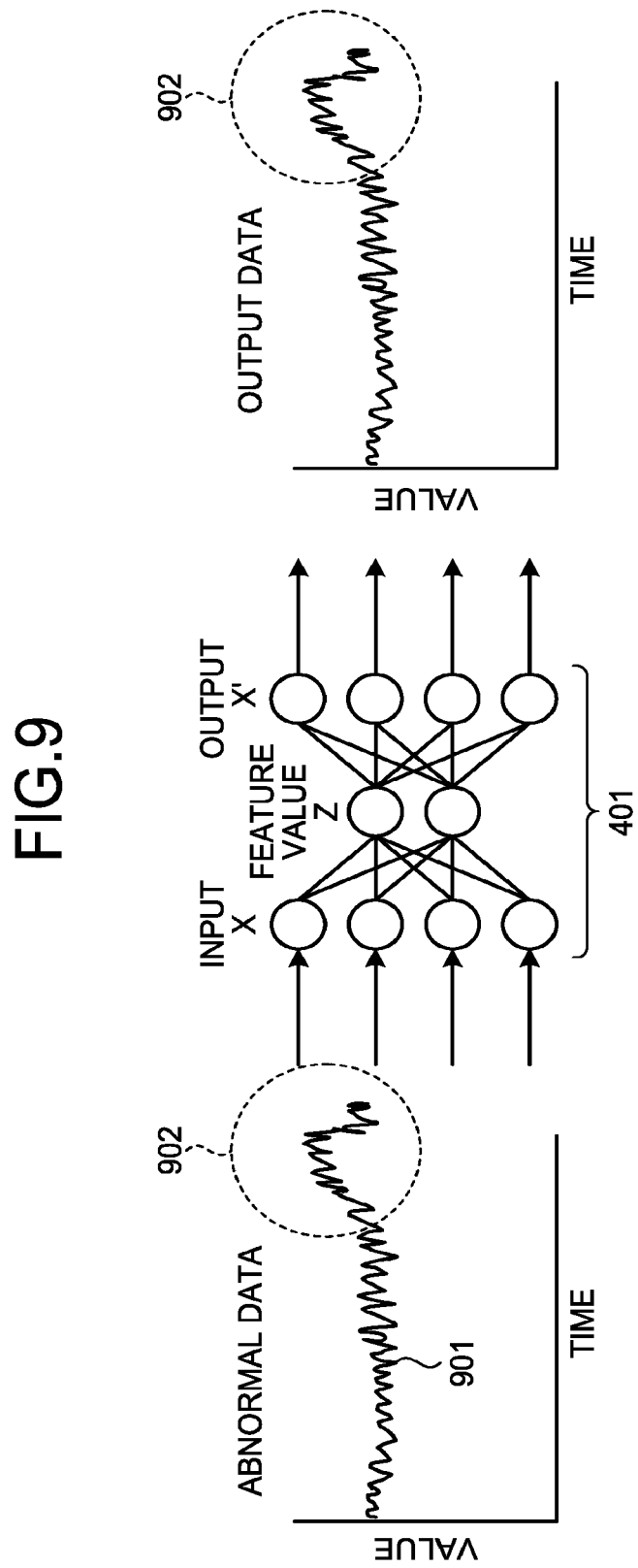

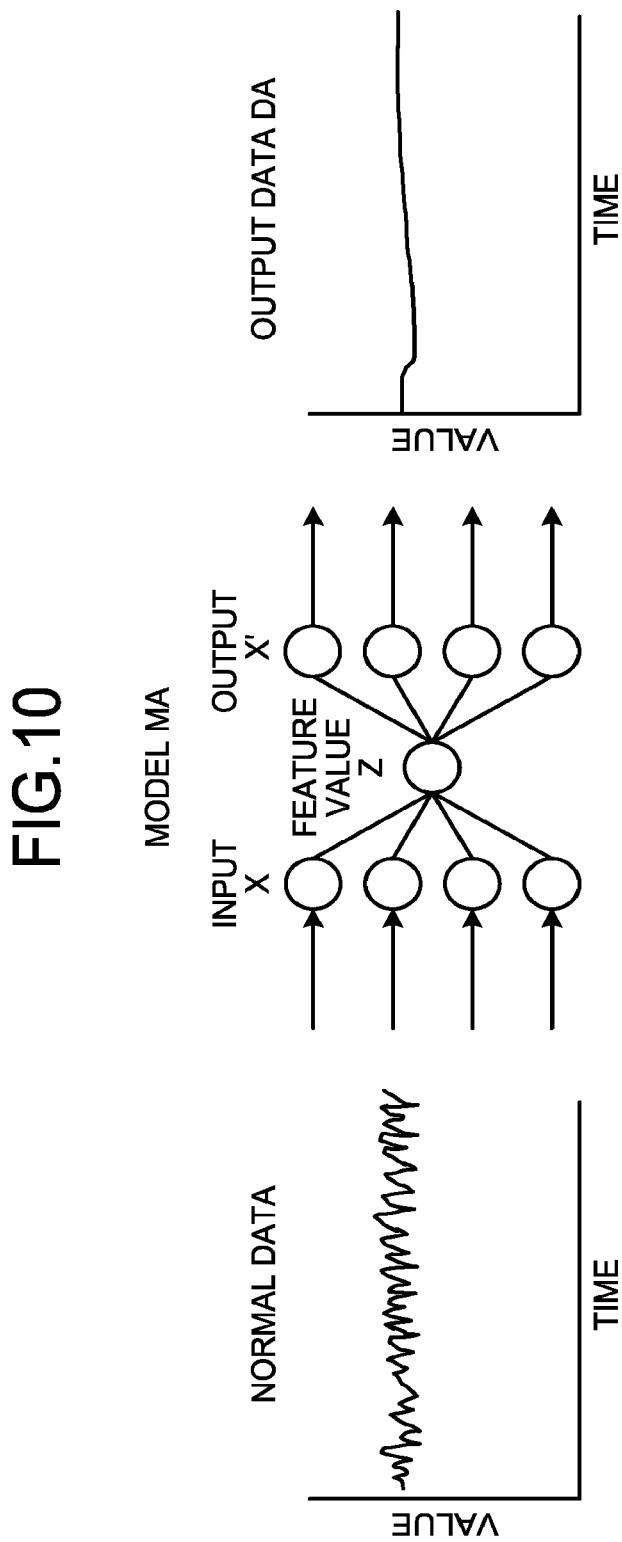

ABNORMALITY DETERMINATION DEVICE, LEARNING DEVICE, AND ABNORMALITY DETERMINATION METHOD

CROSS-REFERENCE TO RELATED APPLICATIONS

This application is based upon and claims the benefit of priority from Japanese Patent Application No. 2019-153993, filed on Aug. 26, 2019; the entire contents of which are incorporated herein by reference.

FIELD

Embodiments described herein relate generally to an abnormality determination device, a learning device, and an abnormality determination method.

BACKGROUND

In large-scale plants such as nuclear power plants and thermal power plants, many process signals are measured for the purpose of monitoring the performance of the plants and the soundness of various systems and instruments constituting the plants. It is difficult for plant operators to constantly monitor all of such many process signals. For this reason, many plants are provided with a monitoring system that captures process signals and detects abnormal changes in the plants.

In the detection of abnormal changes, attempts have been made to detect signs before an abnormality becomes apparent by using a machine learning technology that has developed rapidly in recent years. For example, there has been proposed a technology using a regression model of a sensor predicted value that has learned sensor data at the normal time and a correlation model among sensors using a prediction error of the regression model as an input to predict a failure from an output value of the correlation model.

BRIEF DESCRIPTION OF THE DRAWINGS

FIG. 2 is a flowchart of learning processing in the embodiments;

FIG. 3 is a flowchart of abnormality determination processing in the embodiments;

FIG. 4 is a diagram illustrating an example of data input/output by a model that is an auto encoder;

FIG. 5 is a diagram illustrating an example of data input/output by the model that is an auto encoder;

FIG. 6 is a diagram illustrating an example of a model MA configured as an auto encoder;

FIG. 7 is a diagram for explaining a difference in response between a regression model and the model MA;

FIG. 8 is a diagram for explaining the output of an erroneously learned model;

FIG. 9 is a diagram for explaining the output of an erroneously learned model;

FIG. 10 is a diagram illustrating a configuration example of the model MA;

DETAILED DESCRIPTION

Figure 1:
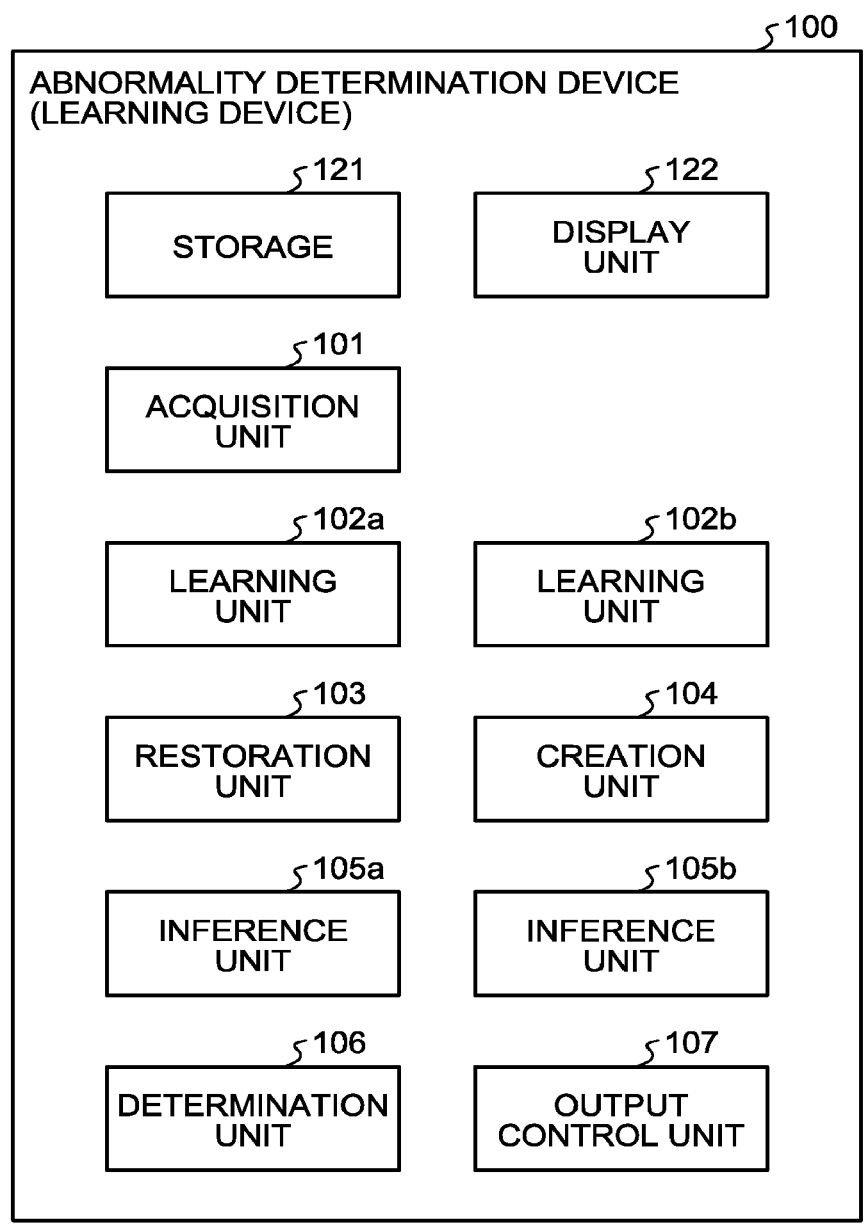
FIG. 1 is a block diagram of an abnormality determination device according to embodiments.

According to one embodiment, an abnormality determination device includes one or more processors. The processors input first input data to a first model to obtain first output data. The first output data is formed by restoring data with the reduced dimension to data with the same dimension as that of the first input data. The processors input second input data, which is a difference between the first input data and the first output data, to a second model, and obtain second output data. The second output data is formed by restoring data with the reduced dimension to data with the same dimension as that of the second input data. The processors obtain restored data that is a sum of the first output data and the second output data. The processors compare the first input data with the restored data and determine an abnormality in the first input data based on the comparison result.

Preferred embodiments of an abnormality determination device according to the present invention will be described below in detail with reference to the accompanying drawings. Hereinafter, a device that determines a plant abnormality using plant data obtained from a plant as input data will be described as an example. Applicable systems and input data are not limited to plant systems and plant data.

In an abnormality sign detection technology, a sign is detected by detecting a slight change in plant data. For this purpose, it is necessary to determine the normal state of the plant with high accuracy. Erroneous determination causes erroneous detection and causes an unnecessary operation of an operator. In order to detect a slight change, it is necessary to determine, with high accuracy, also a minute electrical noise signal that is difficult to remove from data.

However, the prior art involves the following three problems, for example.

(1) In general, a high-accuracy predicted value considering the correlation among sensors cannot be directly obtained from an output value of a correlation model among a plurality of sensors using a prediction error as an input.

(2) The plant is a complex system composed of various systems and instruments, and the internal state of the plant changes in a complex manner even in the normal state. For example, the operating conditions of each system and each instrument often change stepwise. As a result, plant data such as a sensor data value (sensor value) of the corresponding sensor changes abruptly. When the regression model is used, the predicted value (time t) is calculated from past data (time t−1, t−2, . . . ). For this reason, it is difficult to determine an abrupt change without a premonitory sign before the time (t−1).

(3) When a minute electrical noise signal that is uncorrelated with the plant operating state, due to a measuring instrument and a power source to which a plurality of sensors are connected, is superimposed on the sensor value, a single machine learning model often executes erroneous learning and exhibits an identity mapping response to the minute signal. As a result, a minute electrical noise signal is predicted, but an abnormal signal is also predicted as a normal state, so that an abnormality cannot be detected. In addition, electrical noise itself is an event that occurs randomly without time correlation, and thus cannot be predicted by the regression model.

Therefore, the abnormality determination device of the following embodiments uses a model MA (first model) and a model MB (second model), which are two-stage machine learning models, to perform high-accuracy prediction based on a feature value of plant data in the normal state, including stepwise changes in operating conditions and electrical noise signals to accurately detect an abnormality sign of the plant.

FIG. 1 is a block diagram illustrating an example of the configuration of an abnormality determination device 100 according to the present embodiments. As shown in FIG. 1, the abnormality determination device 100 includes storage 121, a display unit 122, an acquisition unit 101, learning units 102a and 102b, a restoration unit 103, a creation unit 104, inference units 105a and 105b, a determination unit 106, and an output control unit 107.

Note that FIG. 1 shows an example in which the abnormality determination device 100 also includes a function as a learning device that learns models. The learning device may be configured as a device independent of the abnormality determination device 100. In this case, the abnormality determination device 100 may not include functions (for example, learning units 102a and 102b) necessary for learning of the models.

The storage 121 stores various types of data for use in various types of processing to be executed by the abnormality determination device 100. For example, the storage 121 stores data indicating model parameters, data for use in learning (learning data), input data inputted to the models, output data output by the models, and the like.

The storage 121 can be composed of any generally-used storage medium such as a flash memory, a memory card, a Random Access Memory (RAM), a Hard Disk Drive (HDD), and an optical disk.

The display unit 122 is a device that displays various types of data such as data indicating a result of abnormality determination processing. The display unit 122 can be composed of a liquid crystal display or the like. Note that the method of outputting the result of the abnormality determination processing is not limited to the method of displaying the result on the display unit 122, and any method may be used. For example, a method of outputting information indicating the result to an external device such as a server via a network, a method of outputting sound to a sound output device such as a speaker, a method of outputting light to a lighting device, or the like may be used.

The acquisition unit 101 acquires various types of data for use in various types of processing to be executed by the abnormality determination device 100. For example, the acquisition unit 101 acquires a plurality of types of plant data output from the plant as input data. The acquisition unit 101 stores data such as the acquired plant data in the storage 121.

The plant data may be any data concerning the plant. For example, a process signal that is at least one of sensor data output from a sensor used in the plant, a command value for the plant system or each instrument, and a computed value obtained by computation using the sensor data can be used as the plant data. The computation using the sensor data may be any computation. For example, computation using a theoretical formula, such as computation for obtaining an average value of a plurality of pieces of sensor data, can be applied.

The command value is a set value or a selected value of an operation mode. For example, for a large number of pumps and solenoid valves constituting the plant, there are command values of the rotation speeds and valve openings of the pumps and solenoid valves, respectively, and pieces of sensor data corresponding to the command values. There are also command values of the flow rates of the main pipings of systems each composed of a plurality of pumps, valves and pipings, and a plurality of pieces of corresponding sensor data.

Thus, in the plant, many sensors and many command values are used. That is, in the abnormality determination device 100, many types of plant data are used. For example, in power generation plants such as nuclear power plants and thermal power plants, the number of types of plant data per plant ranges from thousands to tens of thousands. The acquisition unit 101 acquires all or part of such many types of plant data as a plurality of types of plant data used for determination of an abnormality. For example, all pieces of plant data may be classified for each of the plurality of systems, and an abnormality may be determined using the plant data for each system. When classifying the pieces of plant data for each system in this way, the plant data to be inputted will be several hundred to several thousand types of data, for example. Hereinafter, the type is sometimes referred to as dimension, and a plurality of types of plant data is sometimes referred to as multi-dimensional plant data.

The learning unit 102a (first learning unit) learns a model MA of two models MA and MB used for abnormality determination. The model MA is a model that inputs multi-dimensional plant data (first input data), and outputs multi-dimensional output data DA (first output data) corresponding to data obtained by reducing the dimension of the input plant data and restoring the data with the reduced dimension to data with the same dimension as that of the input plant data. The learning unit 102a executes machine learning using the multi-dimensional plant data at the normal time as learning data to generate the model MA.

If not only the sensor data at the normal time but also command values at the normal time are used as the learning data, it becomes possible to learn the correspondence between instructions of operation conditions (command values) and instruction results (sensor data). As a result, the accuracy of restoring the output data DA in the normal state during an intended determination period is further improved. Further, if the command values are used as the learning data, the definition of the normal state becomes more accurate, so that more accurate data restoration becomes possible.

In addition, in order to detect an abnormality in the plant system unit or the entire plant, which cannot be understood only from the sensor data on a single instrument, it is desirable to include, as the learning data, computed values using the sensor data and computed values of deviations (differences) between the sensor data and the command values. Even a quite minute change, which cannot be detected within the range of prediction accuracy with one sensor data, can be detected by amplifying a minute difference by a computed value (for example, deviation). Further, in the plant operation monitoring system, the computed values may be important monitoring targets, and therefore it is effective to include the computed values in the learning data.

The learning unit 102*b* (second learning unit) learns the model MB of the two models MA and MB used for abnormality determination. The model MB is a model that inputs a difference between the multi-dimensional plant data and the output data DA of the model MA as input data (second input data), and outputs output data DB (second output data) corresponding to data obtained by reducing the dimension of the inputted input data and restoring the data with the reduced dimension to data with the same dimension as that of the input data. The model MB can also be interpreted as a model that outputs restored data on a difference between the input data and the output data of the model MA.

The learning unit 102*b* obtains the input data using the multi-dimensional plant data at the normal time and the output data DA output by the model MA learned using the plant data as the learning data, and learns the model MB using the input data as the learning data.

As described above, the model MA and the model MB are models in which the dimension of the input data is reduced, the data with the reduced dimension is restored to data with the same dimension as that of the input data, and the restored data is output. As such a dimension reduction/restoration model, for example, an auto encoder can be used. The applicable dimension reduction/restoration model is not limited to the auto encoder, and may be any other dimension reduction/restoration model.

The restoration unit 103 calculates a sum of the multi-dimensional output data DA obtained from the model MA and the multi-dimensional output data DB (restored data on the difference) obtained from the model MB, to output restored data corresponding to data obtained by restoring the multi-dimensional plant data.

The creation unit 104 creates a reference (monitoring reference) for use in the abnormality determination processing. The creation unit 104 creates the monitoring reference using, for example, a difference between the multi-dimensional plant data at the normal time and the restored data output by the restoration unit 103. The monitoring reference is, for example, a threshold value to be compared with the difference (absolute value of the difference). If the difference is greater than the threshold value, it is determined that an abnormality has occurred. For example, the creation unit 104 obtains a standard deviation of the difference, and determines the threshold value according to the obtained standard deviation. The creation unit 104 may create a confidence interval obtained from a plurality of pieces of difference data as the monitoring reference. For example, a confidence interval indicating a range in which no erroneous determination occurs within a certain period (such as one year) may be used as the monitoring reference. If the difference is not included in the confidence interval, it is determined that an abnormality has occurred.

Using the models MA and MB created by the learning units 102*a* and 102*b*, respectively, and the monitoring reference created by the creation unit 104, inference processing by the inference units 105*a* and 105*b* that will be described below is executed.

The inference unit 105*a* (first inference unit) executes inference using the model MA. For example, the inference unit 105*a* inputs multi-dimensional plant data obtained during the operation of the plant into the model MA, and obtains, from the model MA, output data DA corresponding to data obtained by reducing the dimension of the inputted multi-dimensional plant data and restoring the data with the reduced dimension to data with the same dimensional data as that of the plant data.

The inference unit 105*b* (second inference unit) executes inference using the model MB. For example, the inference unit 105*b* inputs input data, which is a difference between the multi-dimensional plant data and the output data DA of the model MA to the multi-dimensional plant data, to the model MB, and obtains output data DB corresponding to data obtained by reducing the dimension of the inputted input data and restoring the data with the reduced dimension to data with the same dimension as that of the input data from the model MB.

In the inference processing, the restoration unit 103 calculates a sum of the multi-dimensional output data DA obtained from the inference unit 105*a* and the multi-dimensional output data DB obtained from the inference unit 105*b*, thereby outputting restored data corresponding to data obtained by restoring the multi-dimensional plant data.

The determination unit 106 executes the abnormality determination processing using multi-dimensional plant data and restored data. For example, the determination unit 106 compares the inputted multi-dimensional plant data with the restored data output from the restoration unit 103, and determines an abnormality in the inputted multi-dimensional plant data based on the comparison result. When the threshold value is used as the monitoring reference, the determination unit 106 obtains a difference between the multi-dimensional plant data and the restored data, and determines that an abnormality has occurred when the difference is greater than the threshold value (monitoring reference). When the confidence interval is used as the monitoring reference, the determination unit 106 determines that an abnormality has occurred when the difference is not included in the confidence interval. Note that determining an abnormality in the plant data can also be interpreted as determining an abnormality in the plant that is an input source of the plant data.

The output control unit 107 controls the output of various types of information by various types of processing to be executed by the abnormality determination device 100. For example, the output control unit 107 controls processing for displaying the determination result of the abnormality determination processing by the determination unit 106 on the display unit 122.

Each of the above units (acquisition unit 101, learning units 102*a* and 102*b*, restoration unit 103, creation unit 104, inference units 105*a* and 105*b*, determination unit 106, and output control unit 107) is realized, for example, by one or more of processors. For example, each of the above units may be realized by causing a processor such as a Central Processing Unit (CPU) to execute a program, that is, by software. Each of the above units may be realized by a processor such as a dedicated Integrated Circuit (IC), that is, by hardware. Each of the above units may be realized by using software and hardware together. When using a plurality of processors, each processor may realize one of the respective units, or may realize two or more of the respective units.

Next, learning processing and abnormality determination processing by the abnormality determination device 100 according to the present embodiments configured as described above will be described. FIG. 2 is a flowchart illustrating an example of the learning processing in the present embodiments.

First, the acquisition unit 101 acquires multi-dimensional plant data at the normal time from the plant as the learning data, and stores the multi-dimensional plant data in the storage 121 (step S101). The learning unit 102*a* learns the model MA using the stored learning data (step S102). The learning unit 102b learns the model MB using a difference between the multi-dimensional plant data at the normal time and the output data DA output from the model MA as the learning data (step S103).

Note that the learning unit 102a first learns the model MA, and the learning unit 102b learns the model MB using the learning data created using the data output by the learned model MA.

The restoration unit 103 calculates a sum of the multi-dimensional output data DA output from the model MA and the multi-dimensional output data DB output from the model MB, thereby obtaining restored data of the multi-dimensional plant data (step S104).

The creation unit 104 creates a monitoring reference based on a difference between the multi-dimensional plant data and the multi-dimensional restored data obtained from the restoration unit 103 (step S105).

FIG. 3 is a flowchart illustrating an example of the abnormality determination processing in the present embodiments.

The acquisition unit 101 acquires multi-dimensional plant data to be subjected to abnormality determination from the plant (step S201). The acquisition unit 101 may acquire (extract) the plant data inputted (stored) during a designated intended determination period, among the pieces of plant data inputted from the plant and stored in the storage 121, as plant data to be determined.

The inference unit 105a inputs the acquired plant data to the model MA, and acquires the output data DA from the model MA as an inference result (step S202). The inference unit 105b inputs a difference between the acquired plant data and the output data DA to the model MB, and acquires the output data DB from the model MB as an inference result (step S203).

The restoration unit 103 calculates a sum of the multi-dimensional output data DA output from the model MA and the multi-dimensional output data DB output from the model MB for the multi-dimensional plant data in the intended determination period, thereby obtaining restored data of the multi-dimensional plant data (step S204).

The determination unit 106 determines an abnormality using the restored data (step S205). For example, the determination unit 106 obtains a difference between the multi-dimensional plant data in the intended determination period and the multi-dimensional restored data obtained from the restoration unit 103, and if the difference does not satisfy the monitoring reference, it is determined that the plant is abnormal. The output control unit 107 displays, for example, the plant data, the restored data, the differences, and the monitoring reference on the display unit 122 together with the determination result (step S206).

Next, details of a method for creating the model MA and the model MB will be described. Hereinafter, the case where an auto encoder is used as the model MA and the model MB, respectively, will be described. FIG. 4 and FIG. 5 are each a diagram illustrating an example of data input/output by a model 401 that is an auto encoder. In FIG. 4 and FIG. 5, the numbers of dimensions of input data (input X) and output data (output X') are set to four for convenience of explanation, but are not limited thereto. In addition, the input data and the output data are described using a time change in plant data of a certain dimension as an example.

As shown in FIGS. 4 and 5, the auto encoder (model 401) classifies input data (input X) by a feature value Z extracted from the learning data, and outputs output data (output X') obtained by restoring the original input data from the feature value Z. When learning is performed using data in the normal state (normal data) as learning data, as shown in FIG. 4, the model 401 outputs output data obtained by restoring the normal data in response to the input of the normal data.

On the other hand, as shown in FIG. 5, when data including a feature 501 that is not included in the normal data, i.e., abnormal data is input, the model 401 outputs output data lacking the feature that is not included in the normal data. Accordingly, an abnormality can be detected from a difference between the inputted abnormal data and the restored output data.

FIG. 4 and FIG. 5 each exemplify an auto encoder having one intermediate layer, but the number of intermediate layers may be two or more. In the case of such a configuration, any of the plurality of intermediate layers corresponds to a layer representing the feature value.

FIG. 6 is a diagram illustrating an example of the model MA configured as an auto encoder. The model MA in FIG. 6 is an example of a model having a structure similar to that of the model 401 and obtained by learning multi-dimensional plant data at the normal time as learning data. The model MA serves as a model that restores the plant data at the normal time by using the feature value Z of the plant data at the normal time. In FIG. 6 and subsequent figures, the input data is shown as one or several types of plant data for convenience of explanation.

FIG. 7 is a diagram for explaining a difference in response between a regression model and the model MA. The regression model is, for example, a model that calculates a predicted value (time t) from past data (time t−1, t−2, . . . ). In the plant, the operating conditions often change stepwise in the normal state, and, as a result, the sensor value may change abruptly. However, since the past data (t−1, t−2, . . . ) does not include a premonitory sign of a sudden change in sensor value, it is difficult to predict a stepwise change from the past data.

For this reason, the regression model typically exhibits a response that is gradually close to the sensor value as time passes, as indicated by a line 702 in FIG. 7. On the other hand, in the model MA, the sensor value at the time t is restored using the sensor value at the time t. The stepwise change in sensor value at the time t is included in the input of the model MA. For this reason, if the stepwise change matches the feature extracted from the learning data, the sensor value can be restored in synchronization with the stepwise change. Therefore, the response exhibited by the model MA is a response in which a sudden change in normal sensor value has been restored, as shown by a line 701 in FIG. 7.

Next, the model MB is created by the learning unit 102b. The learning unit 102b learns the model MB using, as the learning data, a difference between the multi-dimensional plant data at the normal time and the output data DA obtained from the model MA. Thus, the model MB serves as a model that restores the difference in the normal state.

Here, the influence of an electrical noise signal will be described. In the plant, for example, one measuring instrument may be configured to measure sensor values output from a plurality of sensors and output the measured sensor values to the abnormality determination device 100 or the like. For example, one power source is connected to the measuring instrument. In such a configuration, a slight electrical noise signal derived from a common measuring instrument and a common power source connected to the measuring instrument, which is uncorrelated with the operation state of the plant, may be superposed on the sensor values output from a plurality of sensors, respectively. In such a case, erroneous learning is often executed when a single model is employed. The measuring instrument and the power source are examples of a common electrical noise source, and any other element may be used as the common electrical noise source.

FIG. 8 and FIG. 9 are each a diagram for explaining the output of the model erroneously learned in this way. For example, it is assumed that the model 401 has been learned to exhibit an identity mapping response that returns the input as it is, as an output, to an input data 801 on which an electrical noise signal is superimposed, as shown in FIG. 8. When abnormal data 901 including an abnormally increased portion 902 as shown in FIG. 9 is input to the model 401 learned in this way, the model 401 outputs output data obtained by restoring the abnormal data as it is.

As a countermeasure against such an electrical noise signal, a method of learning a model using data obtained by removing an electrical noise signal from a sensor value with a low-pass filter or the like in advance is conceivable. However, while the sampling period of the plant time series data is on the order of minutes, the time width of the electrical noise signal waveform is very small (for example, milliseconds or less), and the waveform information (frequency information) of the electrical noise signal is lost from the time series data, so that the electrical noise signal is whitened. Therefore, the electrical noise signal cannot be removed in advance from the sensor value by a low-pass filter or the like. For this reason, the electrical noise signal is also a target for model restoration.

Whitening of the electrical noise signal can be avoided by reducing the sampling period so that the waveform information of the electrical noise signal can be acquired. However, realization of such a function requires new capital investment for system update and enhancement and the like.

Here, in the machine learning, if a plurality of pieces of uncorrelated data are separated and learned separately, there is no possibility of executing erroneous learning of making uncorrelated data correlated, so that the features can be improved with high accuracy.

In addition, the auto encoder that is a dimension reduction/restoration model can set the number of feature values as model parameters, and can be configured not to restore a minute vibration that deviates from the main behavior of the input data by reducing the number of features. In other words, a parameter survey is performed using the number of features as a parameter, and the number of features is appropriately set, whereby a response that restores only the waveform data can be made when a minute vibration is superimposed on certain waveform data. The same applies to other dimension reduction/restoration models.

The model MA of the present embodiments is configured to appropriately set the number of feature values and not to restore any electrical noise signal, in this way. FIG. 10 is a diagram illustrating an example of the thus-configured model MA. FIG. 10 shows that the number of the feature values Z has been reduced from two to one, that is, the number of the feature values has been appropriately set, as compared with FIG. 8. It should be noted that the number of such feature values is shown for convenience of explanation, and is not limited to these. As described above, it is only necessary to determine the number of the feature values so that data is appropriately restored.

The learning unit 102a learns the thus-configured model MA, thereby making it possible to create the model MA that restores only the features of the plant operating state from the normal data and does not restore any electrical noise signal that is a minute vibration.

Figure 11:
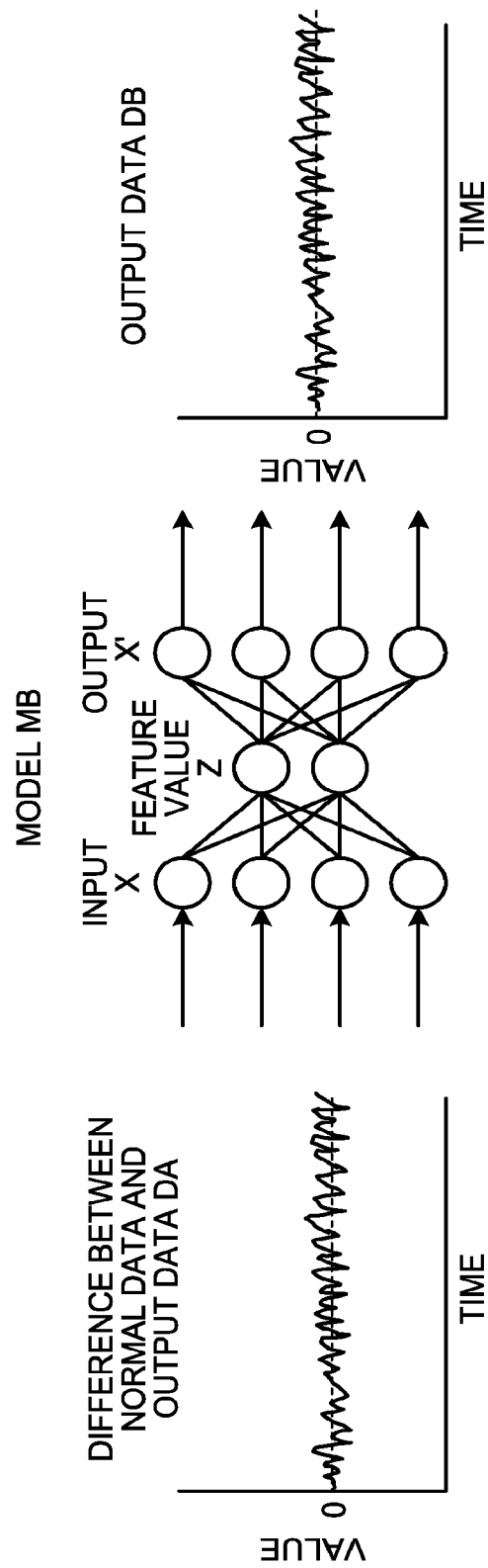
FIG. 11 is a diagram illustrating a configuration example of a model MB.

The electrical noise signal is separately extracted as a difference between the normal data and the output data DA output from the model MA. In the present embodiments, the model MB is learned as a model for restoring the difference. FIG. 11 is a diagram illustrating a configuration example of the model MB. As shown in FIG. 11, the learning unit 102b learns the model MB using the difference as an electrical noise signals. Thus, the learning unit 102b can execute the learning of the model MB so as to learn only the correlation among the sensors of the electrical noise signal derived from the common electrical noise source. The learning unit 102b creates the model MB that correctly restores the electrical noise signal in the normal state by learning.

Figure 12:
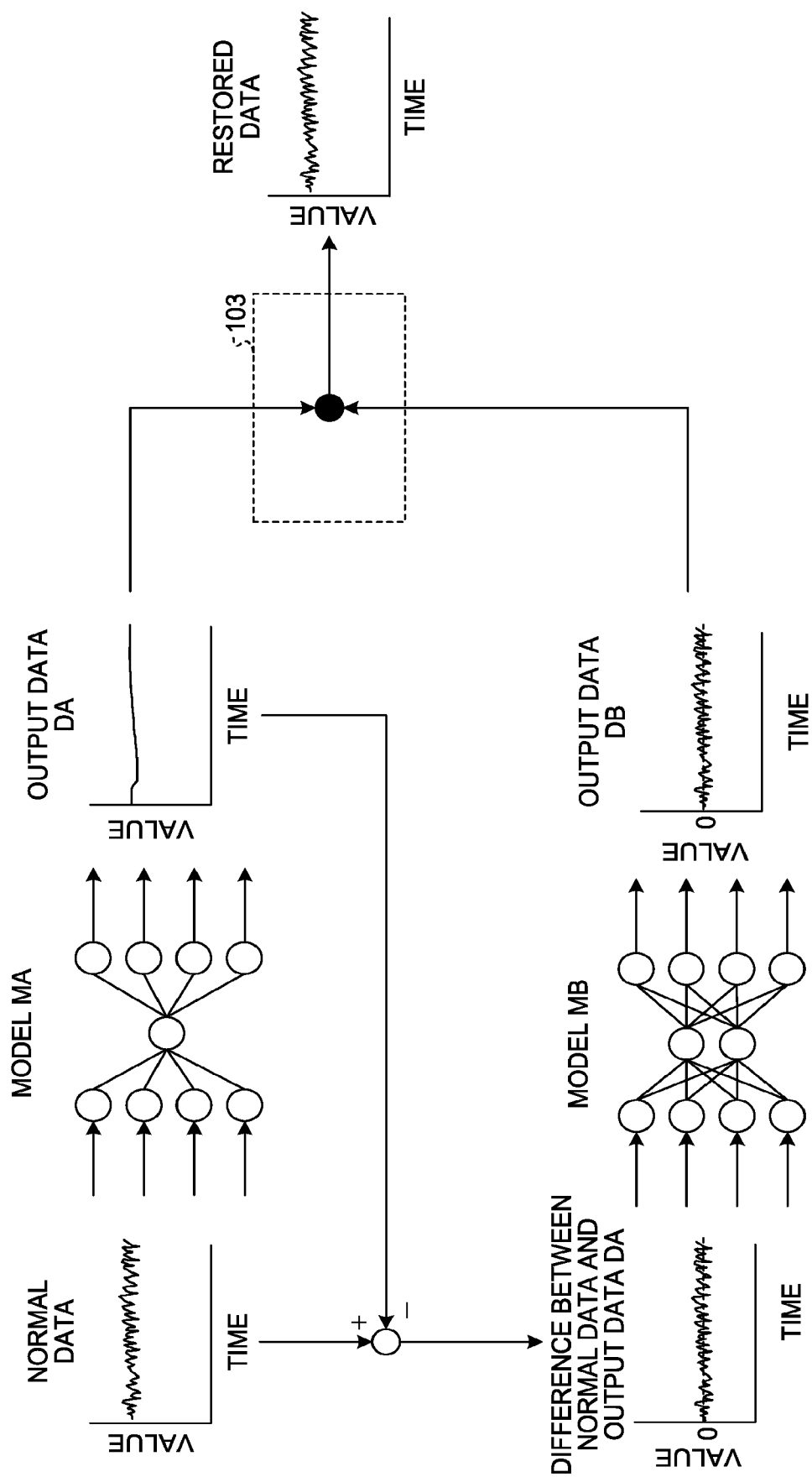
FIG. 12 is a diagram for explaining the overall flow of processing for restoring input data.

FIG. 12 is a diagram for explaining the overall flow of processing for restoring the input data from the outputs of the models MA and MB. As shown in FIG. 12, the restoration unit 103 creates and outputs restored data of the input data by calculating a sum of the output data DA of the model MA and the output data DB of the model MB. By virtue of such a configuration, the input data in the normal state on which the electrical noise signal is superimposed is restored with high accuracy.

Figure 13:
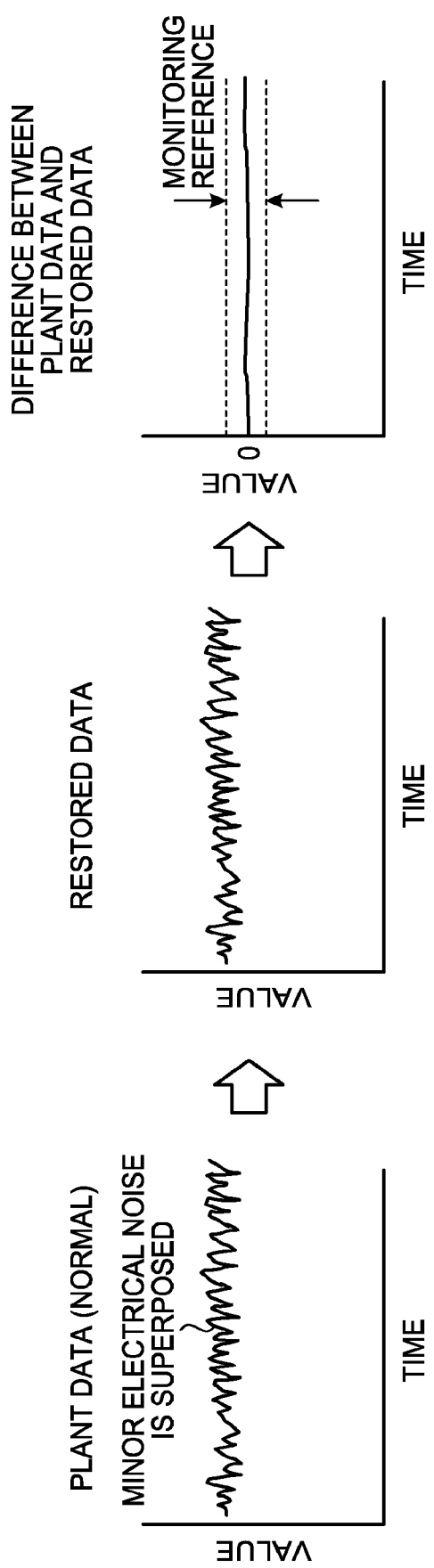
FIG. 13 is a diagram illustrating an example of abnormality determination processing based on a monitoring reference.
Figure 14:
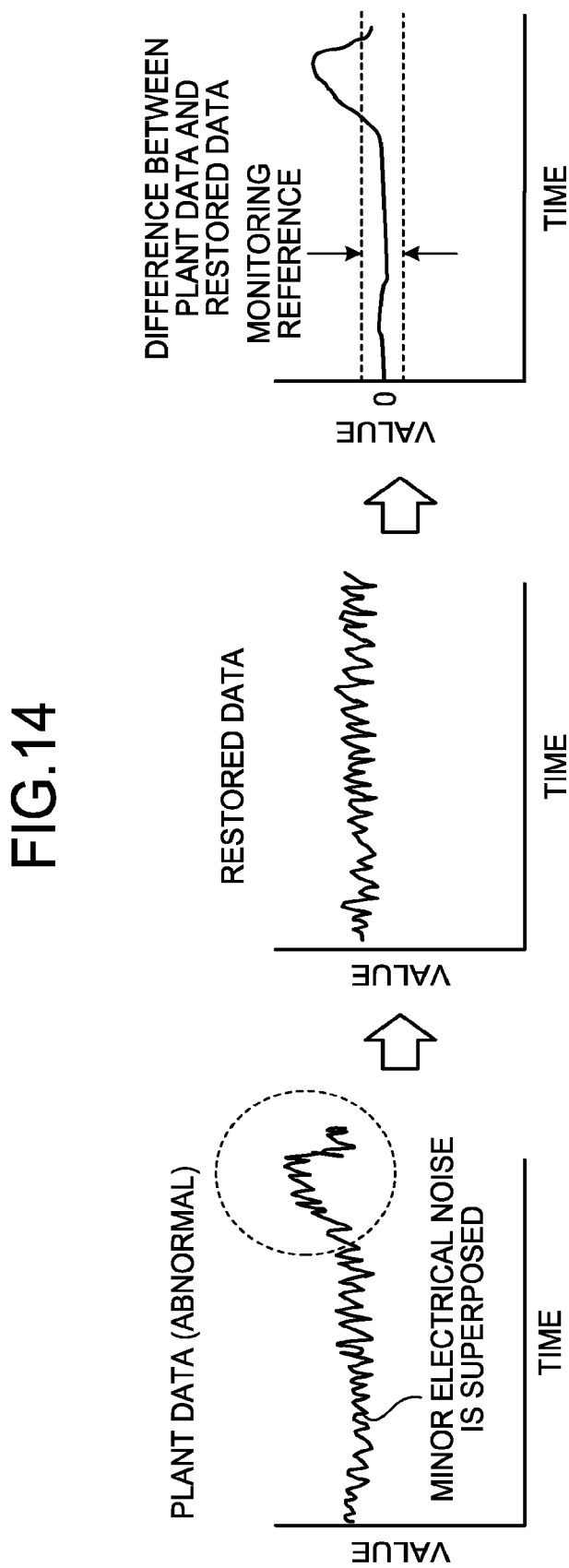
FIG. 14 is a diagram illustrating an example of the abnormality determination processing based on the monitoring reference.

The creation unit 104 creates the monitoring reference from a difference between the plant data at the normal time and the restored data. As described above, the monitoring reference is determined, for example, from the standard deviation of the difference and the confidence interval. FIG. 13 and FIG. 14 are diagrams illustrating an example of the abnormality determination processing based on the monitoring reference.

As shown in FIG. 13, when data having the same features as those of the learning data, that is, normal data having the same features as those of the normal state is input, the restored data is data obtained by restoring the input data (plant data in the intended determination period). Therefore, the determination unit 106 determines that the difference between the input data (plant data) and the restored data satisfies the monitoring reference, and that no abnormality has occurred.

On the other hand, when data that does not have the same features as those of the learning data, that is, abnormal data is input, as shown in FIG. 14, the restored data is not data obtained by restoring the input data. For this reason, the determination unit 106 determines that the difference between the input data (plant data) and the restored data does not satisfy the monitoring reference and that an abnormality has occurred.

The output control unit 107 displays the plant data, the restored data, the difference, and the monitoring reference on the display unit 122 together with the determination result.

As described above, according to the present embodiments, two-stage models (model MA and model MB) can be used to output restored data obtained by restoring the input data in the normal state including a stepwise change in operating conditions and an electrical noise signal with high accuracy. In addition, a slight change in the plant data from the normal state can be detected using the restored data, so that a plant abnormality sign can be detected.

Modification

As described above, the input data is, for example, plant data obtained from a plant. When time series data such as the plant data is used as the input data, time series data at a certain time may be used as the input data, or pieces of time series data at a plurality of times within a designated period (designated period) may be used as the input data. Hereinafter, an example in which a plurality of pieces of time series data within a designated period is used as the input data will be described. If the time series data at one time has m dimensions and the number of times in the designated period is n, the number of dimensions of the input data corresponding to a plurality of pieces of time series data in the designated period is m×n.

Hereinafter, the time series data is assumed to be plant data (time series plant data) including sensor data, a computed value, and a command value. The designated period is a designated period within the intended determination period that is the entire period in which the plant data to be determined is input.

Figure 15:
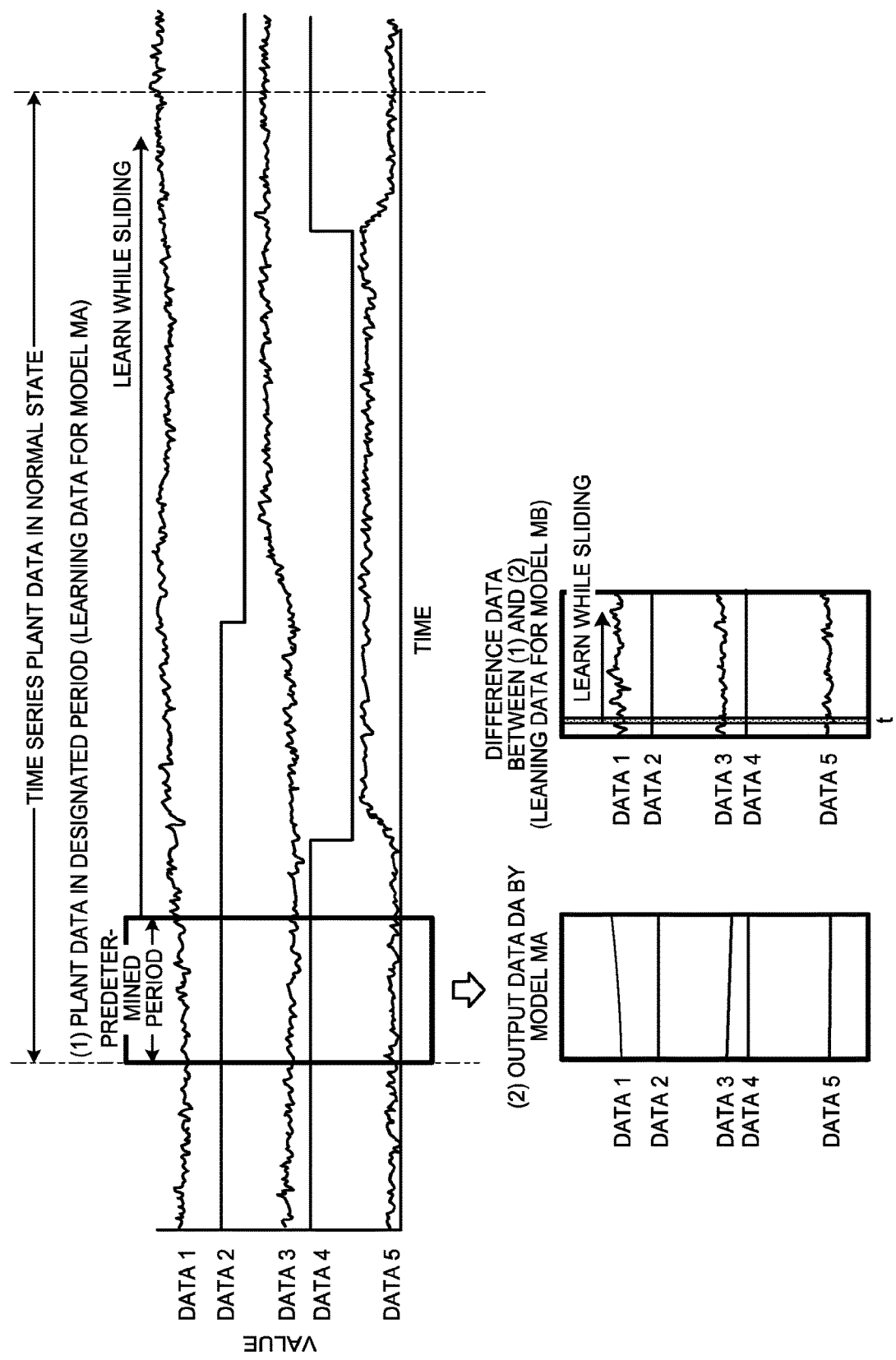
FIG. 15 is a diagram for explaining the flow of learning processing according to a modification.

FIG. 15 is a diagram for explaining the flow of the learning processing according to this modification. The learning unit 102a extracts the time series plant data within the designated period from the multi-dimensional time series plant data at the normal time input within the intended determination period, and the extracted data is used as input data (FIG. 15 (1)). In addition, the learning unit 102a repeats processing of changing the designated period within the intended determination period, extracting the time series plant data within the designated period after change, and using the extracted data as new input data. For example, a method of shifting (sliding) the period so as to include a later time can be employed for changing the designated period. The plurality of designated periods may be designated not to include overlapping times, or may be designated to include overlapping times. Since the numbers of dimensions of the input data are the same, the designated periods are designated so that the numbers of the pieces of time series plant data included in the respective designated periods are the same.

The learning unit 102a learns the model MA using a plurality of pieces of input data corresponding to the plurality of designated periods. The model MA is a model that outputs the output data DA (FIG. 15 (2)) having the same dimension as that of the input data. For example, when the input data has m×n dimensions, the output data DA also has m×n dimensions.

The learning unit 102b learns the model MB using a difference between the value at the time t of the multi-dimensional time series plant data in the designated period at the normal time and the value at the time t of the multi-dimensional output data DA as the learning data. The learning unit 102b calculates the difference while changing the time t within the designated period (for example, sliding the time t so as to be a later time), and uses the difference as the learning data. The learning unit 102b repeats the same processing while changing the designated period. Accordingly, the learning unit 102b creates the model MB that outputs the output data DB corresponding to data obtained by restoring the difference at the time t in the designated period in response to the input of the difference at the time t in the designated period.

Figure 16:
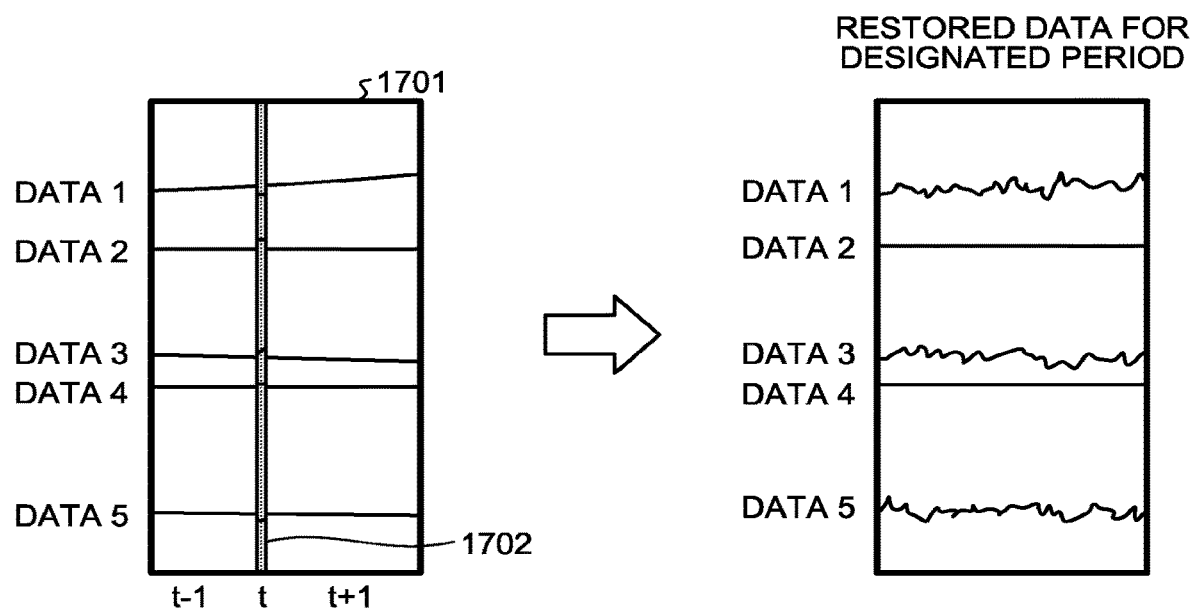
FIG. 16 is a diagram for explaining the flow of data restoration processing according to the modification.

FIG. 16 is a diagram for explaining the flow of data restoration processing according to the present modification. The restoration unit 103 synchronizes, for the time t, multi-dimensional (for example, m×n-dimensional) output data DA (data 1701 in FIG. 16) within the designated period obtained from the model MA and multi-dimensional (for example, m-dimensional) output data DB (data 1702 in FIG. 16) corresponding to the restored data on the difference at the time t within the designated period obtained from the model MB and obtaining a sum of the output data DA and the output data DB at the respective times in the designated period (for example, at each of n times) to output the restored data of the multi-dimensional plant data in the designated period.

The creation unit 104 creates the monitoring reference based on the difference between the multi-dimensional time series plant data at the normal time input during the designated period and the restored data restored for the time series plant data within the designated period. The creation unit 104 changes the designated periods, calculates a difference for each of the changed designated periods, and uses the difference to create the monitoring reference.

The determination unit 106 determines that the plant is abnormal when the difference between the multi-dimensional time series plant data input within the designated periods and the multi-dimensional output data DB obtained from the restoration unit 103 does not satisfy the monitoring reference.

The above configuration makes it possible to further improve the accuracy of restoration of the plant data in the normal state in the intended determination period and to further improve the accuracy of abnormality determination.

In the operation of the plant, there is a time difference (response time) from when the operation manipulation is commanded until each instrument responds, and a time constant until a physical quantity such as pressure or flow rate responds. For this reason, it becomes possible to learn also the time correlation among a plurality of pieces of plant data by using the time series data at a plurality of times in the designated period as the learning data, as in the present modification. Thus, the accuracy of restoring the plant data in the normal state can be improved more.

The length of the designated period is set according to the response times and the time constants. For example, the length of the designated period is set in consideration of the analysis of the frequency for fast Fourier transform of the plant data, the plant operation manipulation procedures, and the like. For example, in a power plant, the designated period is set to several tens of minutes to several hours.

In general, in the machine learning, the accuracy increases as the amount of learning data increases. In this modification, in order to completely use the normal data for learning, the processing of extracting the time series plant data corresponding to the designated period from the time series plant data in the normal state and learning the model MA is executed a plurality of times while changing (sliding) the designated period within the range of the normal state as illustrated in FIG. 15.

Since the time width (up to millisecond) of the waveform of the electrical noise signal is smaller than the sampling period of the time series plant data (generally on the order of minutes), the waveform information (frequency information) of the electrical noise signal is lost from the time series plant data. Since the generation timing of the electrical noise is random in time, the electrical noise signal has no time correlation. For this reason, in the learning of the model MB, in other words, the learning of the electrical noise signal, it is necessary to consider that there is no time correlation in the electrical noise signal that is the learning data.

For example, when time series data pieces at a plurality of times included in the designated period are used as the learning data, there is a possibility of erroneous learning that there is a correlation among uncorrelated time series data. Therefore, in the learning of the model MB, time series data corresponding to an instantaneous value at the time t is used as the learning data, not time series data at a plurality of times within the designated period. Thus, by learning the correlation among the plant data only at the same time, the data in the normal state can be restored with higher accuracy.

In this modification, as shown in the lower part of FIG. 15, in order to completely use the normal data for learning, the processing of extracting the difference between the value at the time t of the multi-dimensional time series plant data in the designated period at the normal time and the value at the time t of the multi-dimensional output data DA obtained from the model MA and changing (sliding) the time t within the designated period for learning is repeated a plurality of times while changing (sliding) the designated period.

The output data DA of the model MA is a plurality of pieces of data corresponding to a plurality of times within the designated period. On the other hand, the output data DB from the model MB is data on the difference in instantaneous value at one time. For example, the output data DA is pieces of data at a plurality of times (t, t−1, t−2, . . . ), whereas the output data DB is data on the instantaneous value (t). For this reason, the number of dimensions of the output data DA is different from the number of dimensions of the output data DB.

Therefore, the restoration unit 103 needs to be configured to obtain a sum between pieces of data different in number of dimensions. In the present modification, as illustrated in FIG. 16, the restoration unit 103 synchronizes, for the time t, the multi-dimensional output data DA in the designated period and the output data DB indicating the difference at the time t within the multi-dimensional designated periods and obtaining the sum of the multi-dimensional output data DA and the output data DB at each time within the designated period, thereby outputting the restored data of the multi-dimensional plant data in the designated period.

As described above, the present embodiments enable higher-accuracy execution of failure determination (detection).

Figure 17:
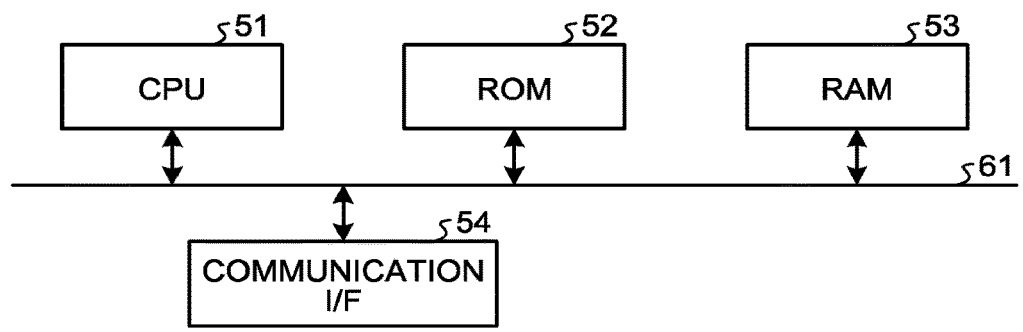
FIG. 17 is a hardware configuration diagram of the abnormality determination device according to the embodiments.

Next, the hardware configuration of the abnormality determination device according to the embodiments will be described with reference to FIG. 17. FIG. 17 is an explanatory diagram illustrating a hardware configuration example of the abnormality determination device according to the embodiment.

The abnormality determination device according to the embodiments includes a control device such as a CPU 51, storage devices such as a Read Only Memory (ROM) 52 and a RAM 53, a communication I/F 54 connected to a network to make communications, and a bus 61 that connects the respective units.

A program to be executed by the abnormality determination device according to the embodiments is provided in a state where the program is incorporated in advance in the ROM 52 or the like.

The program to be executed by the abnormality determination device according to the embodiments may be configured to be recorded in a file of an installable format or an executable format, in a computer readable recording medium such as a Compact Disk Read Only Memory (CD-ROM), a flexible disk (FD), a Compact Disk Recordable (CD-R) or a Digital Versatile Disk (DVD) and provided as a computer program product.

Furthermore, the program to be executed by the abnormality determination device according to the embodiments may be configured to be provided by being stored on a computer connected to a network such as the Internet and downloaded via the network. The program to be executed by the abnormality determination device according to the embodiments may be configured to be provided or distributed via a network such as the Internet.

The program to be executed by the abnormality determination device according to the embodiments can cause a computer to function as each unit of the abnormality determination device described above. In this computer, the CPU 51 can read and execute the program from the computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An abnormality determination device comprising:
one or more processors configured to:
input data collected at a plant at current time as first input data to a first model, and obtain first output data output by the first model, the first output data being formed by restoring first data to a dimension identical to a dimension of the first input data, the first data being formed by reducing a dimension of the first input data;
input second input data to a second model, and obtain second output data output by the second model, the second input data being a difference between the first input data and the first output data, the second output data being formed by restoring second data to a dimension identical to a dimension of the second input data, the second data being formed by reducing a dimension of the second input data;
obtain restored data that is a sum of the first output data and the second output data;
compare the first input data with the restored data and determine an abnormality in the first input data based on a comparison result; and
identify an abnormal operating condition of the plant at the current time based on the determined abnormality in the first input data.

2. The abnormality determination device according to claim 1, wherein the first input data is a plurality of pieces of time series data within a designated period.

3. The abnormality determination device according to claim 1, wherein the first input data is a command value for a plant.

4. The abnormality determination device according to claim 1, wherein the first input data is sensor data output from a sensor for use in a plant.

5. The abnormality determination device according to claim 1, wherein the first input data is a computed value obtained by computation using the sensor data.

6. The abnormality determination device according to claim 1, wherein the first input data is a command value for the plant.

7. The abnormality determination device according to claim 1, wherein the first model and the second model are auto encoders.

8. The abnormality determination device according to claim 1, wherein the one or more processors
learn the first model using data collected at the plant when it was in a normal operating state as a first input data; and
learn the second model using second input data that is a difference between the first input data collected at the plant when it was in a normal operating state and the first output data output by the first model in response to the first input data.

9. The abnormality determination device according to claim 1, wherein the one or more processors control an output of the determined abnormality.

10. The abnormality determination device according to claim 1, wherein the first model is a model that inputs the first input data that is data at a first time, and outputs the first output data that is data obtained by restoring the data at the first time.

11. An abnormality determination device including a learning device comprising:
one or more processors configured to:
learn a first model using first learning data representing data collected at a plant when it was in a normal operating state as first input data, wherein the first model inputs first input data and outputs first output data obtained by restoring first data to a dimension identical to a dimension of the first input data, the first data being formed by reducing a dimension of the first input data; and
learn a second model using second learning data representing a second input data that is a difference between the first input data collected at the plant when it was in a normal operating state and the first output data, and output second output data obtained by restoring second data to a dimension identical to a dimension of the second input data, the second data being formed by reducing a dimension of the second input data;
input data collected at the plant at current time as first input data to the first model, and obtain first output data output by the first model, the first output data being formed by restoring first data to a dimension identical to a dimension of the first input data, the first data being formed by reducing a dimension of the first input data;
input second input data to the second model, and obtain second output data output by the second model, the second input data being a difference between the first input data and the first output data, the second output data being formed by restoring second data to a dimension identical to a dimension of the second input data, the second data being formed by reducing a dimension of the second input data;
obtain restored data that is a sum of the first output data and the second output data;
compare the first input data with the restored data and determine an abnormality in the first input data based on a comparison result; and
identify an abnormal operating condition of the plant at the current time based on the determined abnormality in the first input data.

12. An abnormality determination method comprising:
inputting data collected at a plant at current time as first input data to a first model, and obtaining first output data output by the first model, the first output data being formed by restoring first data to a dimension identical to a dimension of the first input data, the first data being formed by reducing a dimension of the first input data;
inputting second input data to a second model, and obtaining second output data output by the second model, the second input data being a difference between the first input data and the first output data, the second output data being formed by restoring second data to a dimension identical to a dimension of the second input data, the second data being formed by reducing a dimension of the second input data;
obtaining restored data that is a sum of the first output data and the second output data;
comparing the first input data with the restored data and determining an abnormality in the first input data based on a comparison result; and
identifying an abnormal operating condition of the plant at the current time based on the determined abnormality in the first input data.

* * * * *